US012631925B2

(12) United States Patent
Lee

(10) Patent No.: US 12,631,925 B2
(45) Date of Patent: May 19, 2026

(54) DISPLAY DEVICE

(71) Applicant: LG Display Co., Ltd., Seoul (KR)

(72) Inventor: MinGyu Lee, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 108 days.

(21) Appl. No.: 18/604,181

(22) Filed: Mar. 13, 2024

(65) Prior Publication Data

US 2024/0319554 A1 Sep. 26, 2024

(30) Foreign Application Priority Data

Mar. 20, 2023 (KR) ........................ 10-2023-0035563

(51) Int. Cl.
　　*G02F 1/137* (2006.01)
　　*G02F 1/1335* (2006.01)
　　*G02F 1/13363* (2006.01)
　　*G02F 1/1343* (2006.01)
(52) U.S. Cl.
　　CPC ........ *G02F 1/137* (2013.01); *G02F 1/133528* (2013.01); *G02F 1/133638* (2021.01); *G02F 1/13439* (2013.01)
(58) Field of Classification Search
　　CPC .............. G02F 1/137; G02F 1/133638; G02F 1/133528; G02F 1/13439
　　See application file for complete search history.

(56) References Cited

U.S. PATENT DOCUMENTS

| 10,908,333 | B2 * | 2/2021 | Nomura | ................... G02B 1/14 |
| 2011/0013121 | A1 * | 1/2011 | Kashima | ............... G03F 7/2022 |
| | | | | 349/86 |
| 2013/0314647 | A1 * | 11/2013 | Yim | ................... H10K 59/8791 |
| | | | | 445/24 |
| 2018/0350311 | A1 * | 12/2018 | Aoyama | ........... G02F 1/134363 |

FOREIGN PATENT DOCUMENTS

| CN | 104536220 | A | * | 4/2015 | ........... G02F 1/1347 |
| EP | 2530942 | B1 | * | 3/2016 | ............. G02B 30/25 |
| JP | 2016506533 | A | * | 3/2016 | ............. G02B 30/25 |
| KR | 10-2013-0132108 | A | | 12/2013 | |
| KR | 10-2018-0009827 | A | | 1/2018 | |

* cited by examiner

*Primary Examiner* — Lucy P Chien
(74) *Attorney, Agent, or Firm* — Birch, Stewart, Kolasch & Birch, LLP

(57) ABSTRACT

Discussed is a display device capable of enhancing the sharpness and visibility of images implemented on the display device by adjusting light transmittance. The display device can include a first polarizing plate, a transmittance adjusting member disposed on the first polarizing plate, a transparent display panel disposed on the transmittance adjusting member and having a light emitting element, and a second polarizing plate disposed on the transparent display panel.

10 Claims, 12 Drawing Sheets

GCS : GSP, GSC, GOE
DCS : SSP, SSC, SOE

*100*

140

130

120

110

*130*

EP          TP 218
217
216
215
214
213
211

212   225  223  221 227      231 233 235

220                    230

<u>120</u>

330
320
310

DISPLAY DEVICE

CROSS-REFERENCE TO RELATED APPLICATION

This application claims priority to Korean Patent Application No. 10-2023-0035563, filed in the Republic of Korea on Mar. 20, 2023, the entire contents of which are hereby expressly incorporated by reference into the present application.

BACKGROUND

Field

Embodiments of the disclosure relate to a display device with improved displaying capabilities.

Discussion of the Related Art

Since the dawn of the information age, there has been ever increasing demands for various types of display devices that are able to quickly and efficiently display information. Accordingly, various display devices, such as liquid crystal display (LCD), plasma display panel (PDP), quantum dot light emitting display (QLED), and organic light emitting display (OLED), are being used and continuously improved.

The recent growth of such display devices leads to development of transparent display devices that allow users to view objects or images positioned on an opposite side of the display device through the display panel that displays images.

These transparent display devices can be applied to various products, such as partition walls, glass at transportation facilities, building glass, advertising electronic signage, cooler doors, and screen doors due to their space utilization, interior design, and other advantages.

SUMMARY OF THE DISCLOSURE

These transparent display devices have a variety of applications but have drawbacks, such as deteriorated sharpness and visibility of images displayed on the display device due to light transmission. Accordingly, the inventors of the disclosure have invented a display device that enhances the sharpness and visibility of images displayed on the display device by adjusting the light transmittance of the transparent display device.

Embodiments of the disclosure can provide a display device capable of adjusting light transmittance without being limited to a size or arrangement of pixels.

Embodiments of the disclosure can provide a display device capable of enhancing the sharpness and visibility of images displayed on the display device by adjusting light transmittance.

Embodiments of the disclosure can provide a display device capable of low power consumption by enhancing the sharpness and visibility of images displayed on the display device.

Embodiments of the disclosure can provide a display device comprising a first polarizing plate, a transmittance adjusting member disposed on the first polarizing plate, a transparent display panel disposed on the transmittance adjusting member and including a light emitting element, and a second polarizing plate disposed on the transparent display panel.

Embodiments of the disclosure can provide the display device, wherein the transmittance adjusting member includes a first transparent electrode, a liquid crystal layer positioned on the first transparent electrode, and a second transparent electrode positioned on the liquid crystal layer.

Embodiments of the disclosure can provide the display device, wherein the transmittance adjusting member includes a first phase film and a second phase film positioned on the first phase film.

According to embodiments of the disclosure, there can be provided a display device capable of adjusting light transmittance without being limited to the size or arrangement of pixels.

According to embodiments of the disclosure, there can be provided a display device capable of enhancing the sharpness and visibility of images displayed on the display device by adjusting light transmittance.

According to embodiments of the disclosure, there can be provided a display device capable of low power consumption by enhancing the sharpness and visibility of images displayed on the display device.

BRIEF DESCRIPTION OF THE DRAWINGS

The above and other objects, features, and advantages of the disclosure will be more clearly understood from the following detailed description, taken in conjunction with the accompanying drawings, in which.

DETAILED DESCRIPTION OF THE EMBODIMENTS

Figure 1:
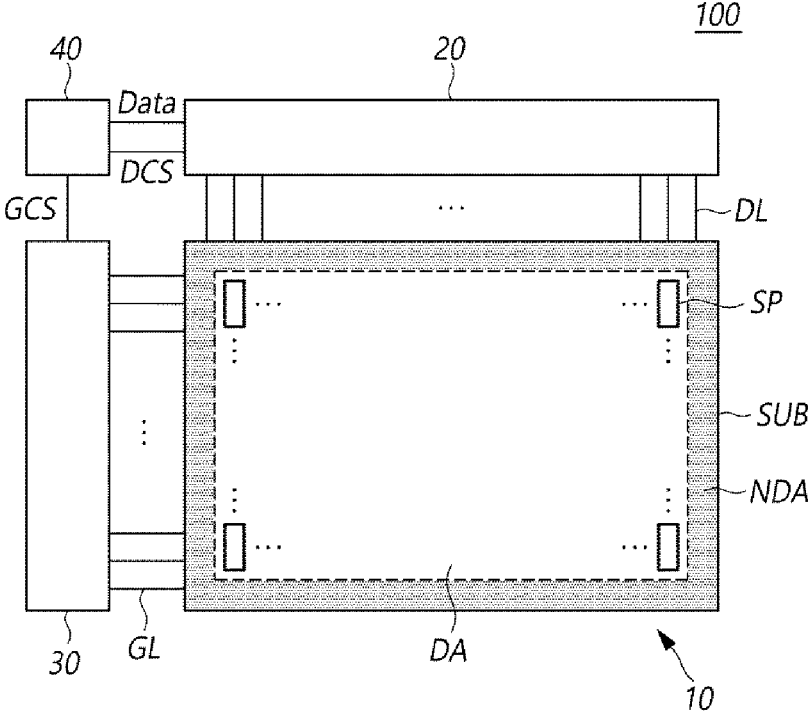
FIG. 1 is a view illustrating a system configuration of a display device according to embodiments of the disclosure.

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description can make the subject matter in some embodiments of the disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" can be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element can be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms can be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that can be caused by various factors (e.g., process factors, internal or external impact, noise, etc.) even when a relevant description is not specified. Further, the term "may" fully encompasses all the meanings of the term "can".

Hereinafter, various embodiments of the disclosure are described in detail with reference to the accompanying drawings.

FIG. 1 is a view illustrating a system configuration of a display device 100 according to embodiments of the disclosure. All components of each display device 100 according to all embodiments of the disclosure are operatively coupled and configured.

Referring to FIG. 1, a display device 100 according to embodiments of the disclosure can include a display panel 10 and driving circuits for driving the display panel 10.

The driving circuits can include a data driving circuit 20 and a gate driving circuit 30. The display device 100 can further include a controller 40 controlling the data driving circuit 20 and the gate driving circuit 30.

The display panel 10 can include a substrate SUB and signal lines, such as a plurality of data lines DL and a plurality of gate lines GL disposed on the substrate SUB.

The display panel 10 can include a plurality of subpixels SP connected to the plurality of data lines DL and the plurality of gate lines GL.

The display panel 10 can include a display area DA in which images are displayed and a non-display area NDA in which no image is displayed. In the display panel 10, a plurality of subpixels SP for displaying images can be disposed in the display area DA, and the driving circuits 20 and 30, and the controller 40 can be electrically connected or disposed in the non-display area NDA. Further, pad units for connection of integrated circuits or a printed circuit can be disposed in the non-display area NDA.

The data driving circuit 20 is a circuit for driving the plurality of data lines DL, and can supply data signals to the plurality of data lines DL. The gate driving circuit 30 is a circuit for driving the plurality of gate lines GL, and can supply gate signals to the plurality of gate lines GL. The controller 40 can supply a data control signal DCS to the data driving circuit 20 to control the operation timing of the data driving circuit 20. The controller 40 can supply a gate control signal GCS for controlling the operation timing of the gate driving circuit 30 to the gate driving circuit 30.

The controller 40 can start scanning according to a timing implemented in each frame, convert input image data input from the outside into image data Data suited for the data signal format used in the data driving circuit 20, supply the image data Data to the data driving circuit 20, and control data driving at an appropriate time suited for scanning.

To control the gate driving circuit 30, the controller 40 can output various gate control signals GCS including a gate start pulse GSP, a gate shift clock GSC, and a gate output enable signal GOE.

To control the data driving circuit 20, the controller 40 can output various data control signals DCS including, e.g., a source start pulse SSP, a source sampling clock SSC, and a source output enable signal SOE.

The controller 40 can be implemented as a separate component from the data driving circuit 20, or the controller 40, along with the data driving circuit 20, can be implemented as an integrated circuit.

The data driving circuit 20 receives the image data Data from the controller 40 and supply data voltages to the plurality of data lines DL, thereby driving the plurality of data lines DL. The data driving circuit 20 is also referred to as a 'source driving circuit.'

The data driving circuit 20 can include one or more source driver integrated circuit (SDICs).

For example, each source driver integrated circuit (SDIC) can be connected with the display panel 10 by a tape automated bonding (TAB) method or connected to a bonding pad of the display panel 10 by a chip on glass (COG) or chip on panel (COP) method or can be implemented by a chip on film (COF) method and connected with the display panel 10.

The gate driving circuit 30 can output a gate signal of a turn-on level voltage or a gate signal of a turn-off level voltage according to the control of the controller 40. The gate driving circuit 30 can sequentially drive the plurality of gate lines GL by sequentially supplying gate signals of the turn-on level voltage to the plurality of gate lines GL.

The gate driving circuit 30 can be connected with the display panel 10 by the TAB method or connected to a bonding pad of the display panel 10 by a COG or COP method or can be connected with the display panel 10 according to the COF method. Alternatively, the gate driving circuit 30 can be formed in a gate in panel (GIP) type, in the non-display area NDA of the display panel 10. The gate driving circuit 30 can be disposed on the substrate SUB or can be connected to the substrate SUB. In other words, the gate driving circuit 30 that is of a GIP type can be disposed in the non-display area NDA of the substrate SUB. The gate driving circuit 30 that is of a chip-on-glass (COG) type or chip-on-film (COF) type can be connected to the substrate SUB.

Meanwhile, at least one of the data driving circuit 20 and the gate driving circuit 30 can be disposed in the display area DA. For example, at least one of the data driving circuit 20 and the gate driving circuit 30 can be disposed not to overlap the subpixels SP or to overlap all or some of the subpixels SP.

When a specific gate line GL is opened by the gate driving circuit 30, the data driving circuit 20 can convert the image data Data received from the controller 40 into an analog data voltage and supply it to the plurality of data lines DL.

The data driving circuit 20 can be connected to one side (e.g., an upper or lower side) of the display panel 10. Depending on the driving scheme or the panel design scheme, data driving circuits 20 can be connected with both the sides (e.g., both the upper and lower sides) of the display panel 10, or two or more of the four sides of the display panel 10.

The gate driving circuit 30 can be connected to one side (e.g., a left or right side) of the display panel 10. Depending on the driving scheme or the panel design scheme, gate driving circuits 30 can be connected with both the sides (e.g., both the left and right sides) of the display panel 10, or two or more of the four sides of the display panel 10.

The controller 40 can be a timing controller used in typical display technology, a control device that can perform other control functions as well as the functions of the timing controller, or a control device other than the timing controller, or can be a circuit in the control device. The controller 40 can be implemented as various circuits or electronic components, such as an integrated circuit (IC), a field programmable gate array (FPGA), an application specific integrated circuit (ASIC), or a processor.

The controller 40 can be mounted on a printed circuit board or a flexible printed circuit and can be electrically connected with the data driving circuit 20 and the gate driving circuit 30 through the printed circuit board or the flexible printed circuit.

The display device 100 according to embodiments of the disclosure can be a display including a backlight unit, such as a liquid crystal display, or can be a self-emission display, such as an organic light emitting diode (OLED) display, a quantum dot display, or a micro light emitting diode (LED) display.

According to an embodiment, when the display device 100 is an OLED display, each subpixel SP can include an organic light emitting diode (OLED), which is self-luminous, as a light emitting element. According to an embodiment, when the display device 100 is a quantum dot display, each subpixel SP can include a light emitting element formed of a quantum dot, which is a self-luminous semiconductor crystal. If the display device 100 according to embodiments is a micro LED display, each subpixel SP can include a micro LED, which is self-emissive and formed of an inorganic material, as the light emitting element.

Figure 2:
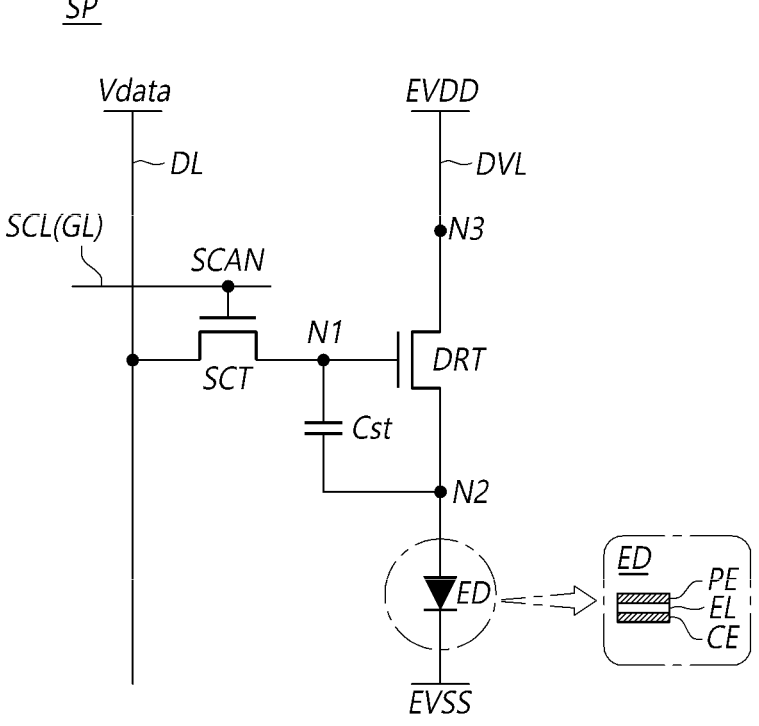
FIG. 2 is an equivalent circuit diagram illustrating a subpixel of a display device according to embodiments of the disclosure.

FIG. 2 is an equivalent circuit diagram illustrating a subpixel SP of a display device 100 according to embodiments of the disclosure.

Referring to FIG. 2, each of a plurality of subpixels SP disposed on a display panel 10 of a display device 100 according to embodiments of the disclosure can include a light emitting element ED, a driving transistor DRT, a scan transistor SCT, and a storage capacitor Cst.

Referring to FIG. 2, the light emitting element ED can include a pixel electrode PE and a common electrode CE and can include a light emitting layer EL positioned between the pixel electrode PE and the common electrode CE.

The pixel electrode PE of the light emitting element ED can be an electrode disposed in each subpixel SP, and the common electrode CE can be an electrode commonly disposed in all the subpixels SP. Here, the pixel electrode PE can be an anode electrode, and the common electrode CE can be a cathode electrode. Conversely, the pixel electrode PE can be a cathode electrode, and the common electrode CE can be an anode electrode.

For example, the light emitting element ED can be an organic light emitting diode (OLED), a light emitting diode (LED), or a quantum dot light emitting element.

The driving transistor DRT is a transistor for driving the light emitting element ED, and can include a first node N1, a second node N2, and a third node N3.

The first node N1 of the driving transistor DRT can be a gate node of the driving transistor DRT, and can be electrically connected with a source node or a drain node of the scan transistor SCT. The second node N2 of the driving transistor DRT can be a source node or a drain node of the driving transistor DRT, and can be electrically connected with a source node or a drain node of a sensing transistor SENT (not illustrated) and can also be electrically connected with the pixel electrode PE of the light emitting element ED. The third node N3 of the driving transistor DRT can be electrically connected with a driving voltage line DVL supplying a driving voltage EVDD.

The scan transistor SCT can be controlled by a scan signal SCAN, which is a type of gate signal, and can be connected between the first node N1 of the driving transistor DRT and the data line DL. In other words, the scan transistor SCT can be turned on or off according to the scan signal SCAN supplied from the scan signal line SCL, which is a type of the gate line GL, controlling the connection between the data line DL and the first node N1 of the driving transistor DRT.

The scan transistor SCT can be turned on by the scan signal SCAN having a turn-on level voltage and transfer the data voltage Vdata supplied from the data line DL to the first node N1 of the driving transistor DRT.

If the scan transistor SCT is an n-type transistor, the turn-on level voltage of the scan signal SCAN can be a high level voltage. If the scan transistor SCT is a p-type transistor, the turn-on level voltage of the scan signal SCAN can be a low level voltage.

The storage capacitor Cst can be electrically connected between the first node N1 and second node N2 of the driving transistor DRT. The storage capacitor Cst is charged with the quantity of electric charge corresponding to the voltage difference between both ends thereof and serves to maintain the voltage difference between both ends for a predetermined frame time. Accordingly, during the predetermined frame time, the corresponding subpixel SP can emit light.

The structure of the subpixel SP shown in FIG. 2 is merely an example, and various changes can be made thereto, e.g., such as including one or more transistors or one or more capacitors. The plurality of subpixels SP can have the same structure, or some of the plurality of subpixels SP can have a different structure. Each of the driving transistor DRT and the scan transistor SCT can be an n-type transistor or a p-type transistor.

The display device 100 according to embodiments of the disclosure can have a top emission structure or a bottom emission structure. The top emission structure is described below as an example. For example, in the top emission structure, the anode electrode can be a reflective metal, and the cathode electrode can be a transparent conductive film.

Figure 3:
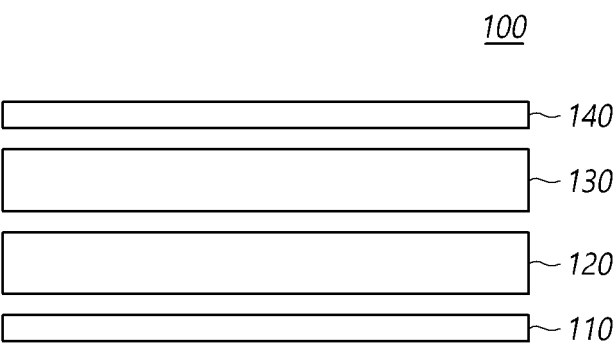
FIG. 3 is a view schematically illustrating a stacked structure of a display device according to embodiments of the disclosure.

FIG. 3 is a view schematically illustrating a stacked structure of a display device according to embodiments of the disclosure.

Referring to FIG. 3, the display device 100 according to embodiments of the disclosure can include a first polarizing plate 110, a transmittance adjusting member 120, a transparent display panel 130, and a second polarizing plate 140.

As illustrated in FIG. 3, the display device 100 according to embodiments of the disclosure can include a first polarizing plate 110, while a transmittance adjusting member 120 can be disposed on the first polarizing plate 110, a transparent display panel 130 can be disposed on the transmittance adjusting member 120 and can include a light emitting element, and a second polarizing plate 140 can be disposed on the transparent display panel 130.

The first polarizing plate 110 and the second polarizing plate 140 can be linear polarizing plates that polarize and transmit incident light in one direction.

The light transmission axis of the first polarizing plate 110 and the light transmission axis of the second polarizing plate 140 can be disposed to be parallel or orthogonal to each other.

The first polarizing plate 110 and the second polarizing plate 140 can be polarizing plates obtained by adsorbing a two-color material, such as iodine or a two-color dye, to a hydrophilic polymer film, such as a polyvinyl alcohol-based film, a partially formalized polyvinyl alcohol-based film, or an ethylene/vinyl acetate copolymer-based partially saponificated film and one-axis stretching it, or a polyene-based oriented film such as a dehydrated material of polyvinyl alcohol or a dechlorinated material of polyvinyl chloride, etc. The first polarizing plate 110 and the second polarizing plate 140 can be polarizing plates of the same material or polarizing plates of different materials.

The display device 100 according to embodiments of the disclosure can include a light transmission mode in which light transmitted through the transmittance adjusting member 120 is transmitted through the second polarizing plate 140 and a light blocking mode in which the light transmitted through the transmittance adjusting member 120 is blocked by the second polarizing plate 140.

The display device 100 according to embodiments of the disclosure can adjust light transmittance by including the light transmission mode and the light blocking mode, thereby enhancing the sharpness and visibility of the image implemented in the display device.

The display device 100 according to embodiments of the disclosure can adjust light transmittance, thereby enhancing sharpness and visibility of the implemented image, thereby enabling low power consumption.

For example, the light transmission axis of the first polarizing plate 110 and the light transmission axis of the second polarizing plate 140 can be disposed to be parallel to each other.

The light transmitted through the first polarizing plate 110 can be linearly polarized in one direction, and when the linearly polarized light is transmitted without being polarized by the transmittance adjusting member 120, the light can be transmitted through the second polarizing plate 140 since the light transmission axis of the first polarizing plate 110 and the light transmission axis of the second polarizing plate 140 are parallel to each other. In other words, the light transmitted through the first polarizing plate 110 and the light transmitted through the transmittance adjusting member can be linearly polarized in the same direction and transmitted through the second polarizing plate 140.

On the other hand, when the light transmitted through the first polarizing plate 110 is linearly polarized in one direction and the linearly polarized light is linearly polarized and transmitted by the transmittance adjusting member 120, the light may not pass through the second polarizing plate 140 but can be blocked since the light transmission axis of the first polarizing plate 110 and the light transmission axis of the second polarizing plate 140 are parallel to each other. In other words, the light transmitted through the first polarizing plate 110 and the light transmitted through the transmittance adjusting member can be linearly polarized in directions orthogonal to each other and can be blocked by the second polarizing plate 140.

For example, the light transmission axis of the first polarizing plate 110 and the light transmission axis of the second polarizing plate 140 can be disposed to be orthogonal to each other.

The light transmitted through the first polarizing plate 110 can be linearly polarized in one direction, and when the linearly polarized light is transmitted without being polarized by the transmittance adjusting member 120, the light can be blocked by the second polarizing plate 140 since the light transmission axis of the first polarizing plate 110 and the light transmission axis of the second polarizing plate 140 are orthogonal to each other. In other words, the light transmitted through the first polarizing plate 110 and the light transmitted through the transmittance adjusting member can be linearly polarized in the same direction and can be blocked by the second polarizing plate 140.

On the other hand, when the light transmitted through the first polarizing plate 110 is linearly polarized in one direction and the linearly polarized light is linearly polarized and transmitted by the transmittance adjusting member 120, the light can pass through the second polarizing plate 140 since the light transmission axis of the first polarizing plate 110 and the light transmission axis of the second polarizing plate 140 are orthogonal to each other. In other words, the light transmitted through the first polarizing plate 110 and the light transmitted through the transmittance adjusting member 120 can be linearly polarized in directions orthogonal to each other and can pass through the second polarizing plate 140.

The transparent display panel 130 included in the display device 100 according to embodiments of the disclosure is a transparent display panel including a light emitting element, and can have a top emission structure or a bottom emission structure. Hereinafter, a top emission structure including an organic light emitting element is described as an example.

Figure 4:
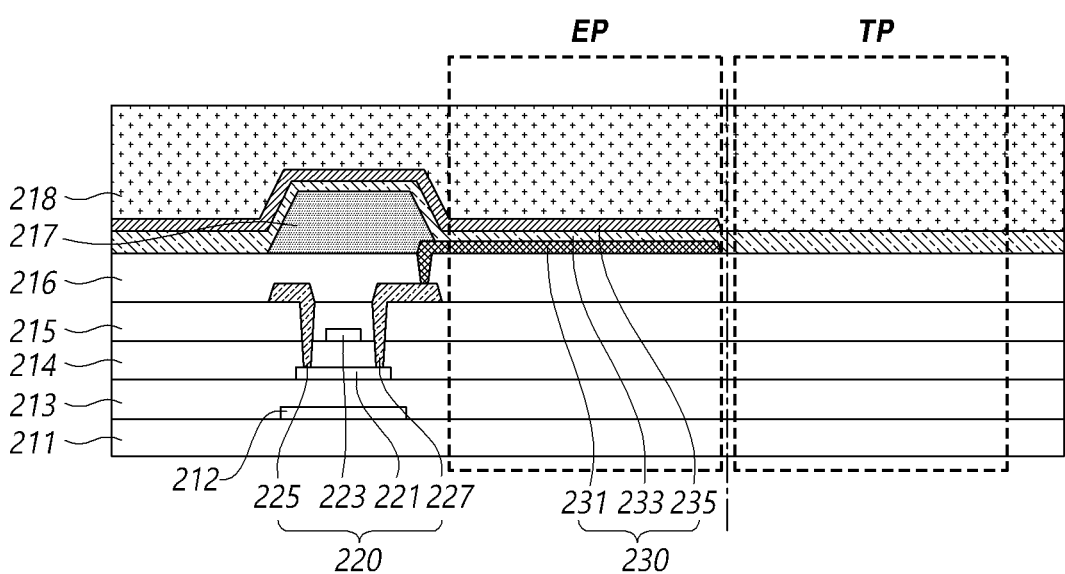
FIG. 4 is a cross-sectional view illustrating an example transparent display panel applied to a display device according to embodiments of the disclosure.

FIG. 4 is a cross-sectional view illustrating an example transparent display panel 130 applied to a display device 100 according to embodiments of the disclosure.

Referring to FIG. 4, the transparent display panel 130 can include an emission portion EP and a transparent portion TP. The emission portion EP and the transparent portion TP can be portions of the area constituting the transparent display panel 130. The emission portion EP and the transparent portion TP can be positioned in the display area DA.

The emission portion EP can include a light emitting element. Since the light emitting element is positioned in the emission portion EP, light can be emitted from the emission portion EP so that the display device 100 can display information.

The transparent portion TP can be a transparent portion in the display area DA. Since the transparent portion TP is positioned in the display area DA, the display device 100 can operate as a transparent display device by transmitting light.

Referring to FIG. 4, the transparent display panel 130 can include a thin film transistor 220 and an organic light emitting element 230 on the substrate 211.

The substrate 211 can be a transparent substrate. FIG. 4 illustrates a single-layered substrate 211, but embodiments of the disclosure are not limited thereto. The substrate 211 can be implemented in a multi-layer structure in which organic films and inorganic films are alternately stacked. For example, a transparent organic film such as polyimide and a transparent inorganic film such as silicon oxide (SiOx), silicon nitride (SiNx), or silicon oxynitride (SiON) can be alternately stacked in the substrate 211.

A light shield 212 can be disposed on the substrate 211. The light shield 212 can be disposed below the thin film transistor 220 at a position overlapping the thin film transistor 220. The light shield 212 can block light incident on the active layer 221 of the thin film transistor 220 to ensure reliability of the thin film transistor 220.

Further, the light shield 212 can be disposed at a position not overlapping the transparent portion TP. As the light shield 212 is disposed not to overlap the transparent portion TP, the transparent portion TP can have a higher light transmittance.

A buffer layer 213 can be disposed on the substrate 211 and the light shield 212.

The buffer layer 213 can include an inorganic insulating material such as silicon oxide (SiOx), silicon nitride (SiNx), or silicon oxynitride (SiON), but embodiments of the disclosure are not limited thereto. FIG. 4 illustrates a structure including a single-layered buffer layer 213, but embodiments of the disclosure are not limited thereto. For example, in the buffer layer 213, silicon oxide (SiOx) and silicon nitride (SiNx) can be alternately stacked.

The thin film transistor 220 can be disposed on the buffer layer 213.

The thin film transistor 220 can include an active layer 221, a gate electrode 223, a source electrode 225, and a drain electrode 227.

Specifically, the active layer 221 can be disposed on the buffer layer 213.

The active layer 221 can be formed of an oxide semiconductor. The material constituting the active layer 221 can be a metal oxide semiconductor and include an oxide of a metal among molybdenum (Mo), zinc (Zn), indium (In), gallium (Ga), tin (Sn), and titanium (Ti) or a combination of a metal among molybdenum (Mo) zinc (Zn), indium (In), gallium (Ga), tin (Sn), and titanium (Ti) and its oxide.

For example, the active layer 221 can include at least one of zinc oxide (ZnO), zinc-tin oxide (ZTO), zinc-indium oxide (ZIO), indium oxide (InO), titanium oxide (TiO), indium-gallium-zinc oxide (IGZO), and indium-zinc-tin oxide (IZTO), but embodiments of the disclosure are not limited thereto. In an embodiment of the disclosure, the active layer 221 can be transparent, but such is not required, as translucent materials can be used. Materials other than oxides, such as a metal that is transparent or translucent can also be used, as well as other conductive materials.

A gate insulation film 214 can be disposed on a portion of the upper surface and a side surface of the active layer 221. The gate insulation film 214 can also be disposed on the buffer layer 213.

The gate insulation film 214 can be formed of, e.g., an inorganic insulating material such as silicon oxide (SiOx), silicon nitride (SiNx), or silicon oxynitride (SiON). But embodiments of the disclosure are not limited thereto.

A gate electrode 223 can be disposed on the gate insulation film 214.

The gate electrode 223 can include any one of molybdenum (Mo), aluminum (Al), chromium (Cr), gold (Au), platinum (Pt), titanium (Ti), nickel (Ni), neodymium (Nd), palladium (Pd), silver (Ag), tungsten (W), and copper (Cu), or an alloy thereof, or can include a transparent conductive material, but embodiments of the disclosure are not limited thereto.

FIG. 4 illustrates a structure including a single-layered gate electrode 223, but embodiments of the disclosure are not limited thereto. For example, the gate electrode 223 can have a multilayer structure including two layers or three or more layers.

As illustrated in FIG. 4, an area in which the active layer 221 overlaps the gate electrode 223 can be a channel area of the thin film transistor 220.

An area in which the active layer 221 does not overlap the gate electrode 223 can be a conductive area.

An interlayer insulation layer 215 can be disposed on the gate electrode 223. The interlayer insulation layer 215 can also be disposed on the gate insulation film 214.

The interlayer insulation layer 215 can be formed of an inorganic insulating material such as silicon oxide (SiOx), silicon nitride (SiNx), or silicon oxynitride (SiON). But embodiments of the disclosure are not limited thereto.

The source electrode 225 and the drain electrode 227 can be disposed on the interlayer insulation layer 215.

The source electrode 225 and the drain electrode 227 can be electrically and physically connected to the conductive area of the active layer 221.

The source electrode 225 and the drain electrode 227 can be electrically and physically connected to the conductive area of the active layer 221 through a contact hole that passes through the gate insulation film 214 and the interlayer insulation layer 215.

FIG. 4 illustrates that the drain electrode 227 is connected to the anode electrode 231 of the organic light emitting element 230, but the source electrode 225 can be connected to the anode electrode 231 in another embodiment of the disclosure.

Each of the source electrode 225 and the drain electrode 227 can include various conductive materials. For example, the source electrode 225 and the drain electrode 227 can include any one of molybdenum (Mo), aluminum (Al), chromium (Cr), gold (Au), platinum (Pt), titanium (Ti), nickel (Ni), neodymium (Nd), palladium (Pd), silver (Ag), tungsten (W), and copper (Cu), or an alloy thereof, or can include a transparent conductive material, but embodiments of the disclosure are not limited thereto.

FIG. 4 illustrates a structure including a single-layered source electrode 225 and a single-layered drain electrode 227, but embodiments of the disclosure are not limited thereto. For example, the source electrode 225 and the drain electrode 227 can each have a multilayer structure including two or three or more layers.

A passivation layer 216 for insulating the thin film transistor 220 can be disposed on the source electrode 225 and the drain electrode 227. The passivation layer 216 can be disposed on the interlayer insulation layer 215.

The passivation layer 216 can be formed of an inorganic insulating material such as silicon oxide (SiOx), silicon nitride (SiNx), or silicon oxynitride (SiON). But embodiments of the disclosure are not limited thereto.

The organic light emitting element 230 and the bank 217 can be formed on the passivation layer 216. The organic light emitting element 230 can include an anode electrode 231, an organic light emitting layer 233, and a cathode electrode 235.

The anode electrode 231 can be disposed on the passivation layer 216. The anode electrode 216 can be disposed in the emission portion EP.

The anode electrode 231 can be electrically and physically connected to the drain electrode 227 of the thin film transistor 220 through a contact hole that passes through the passivation layer 216.

The bank 217 can be formed at the boundary of the subpixel areas. The bank 217 can be formed to cover an edge of the anode electrode 231 on the passivation layer 216 to divide the subpixel areas.

The bank 217 can be formed of an organic material such as an acryl resin, an epoxy resin, a phenolic resin, a polyamide resin, a polyimide resin, or the like. But embodiments of the disclosure are not limited thereto.

An organic light emitting layer 233 can be formed on the anode electrode 231 and the bank 217. Specifically, the organic light emitting layer 233 can cover the bank 217, and cover a portion of the anode electrode 231 not covered by the bank 217. Further, the organic light emitting layer 233 can be disposed on the passivation layer 216 of the transparent portion TP.

The organic light emitting layer 233 can emit any one of red light, green light, blue light, and white light. The organic light emitting layer 233 can be, e.g., a white light emitting layer that emits white light. In this case, the organic light emitting layer 233 can be formed in a tandem structure in which two or more stacks are stacked. Each stack can include a hole transporting layer, at least one light emitting layer, and an electron transporting layer, for example, but embodiments of the disclosure are not limited thereto as other layers or different layers can be used. A charge generation layer can be formed between the stacks. But embodiments of the disclosure are not limited thereto.

In embodiments of the disclosure, the organic light emitting element 230 can be implemented in a top emission method of emitting light in a direction opposite to a direction facing the substrate 211, i.e., in an upward direction. In this case, the anode electrode 231 can be a reflective electrode including a metal material having a low work function and excellent reflection efficiency.

The anode electrode 231 can be, e.g., a stacked structure (Ti/Al/Ti) of aluminum and titanium, a stacked structure (ITO/Al/ITO) of aluminum and indium tin oxide (ITO), a stacked structure (ITO/Ag/ITO) of silver and ITO, a stacked structure (ITO/MoTi/ITO) of molybdenum titanium (MoTi) and ITO, a stacked structure (IZO/MoTi/ITO) of indium zinc oxide (IZO), MoTi, and ITO, an APC alloy, and a stacked structure (ITO/APC/ITO) of an APC alloy and ITO. The APC alloy is an alloy of silver (Ag), palladium (Pd), and copper (Cu). But embodiments of the disclosure are not limited thereto. Also, a single layer structure can also be used for the anode electrode 231.

Further, the anode electrode 231 can include a reflective electrode and a transparent electrode disposed on the reflective electrode. The reflective electrode can be the above-described reflective metal, and the transparent electrode can include transparent conductive oxide (TCO) such as indium tin oxide (ITO), indium zinc oxide (IZO), indium gallium zinc oxide (IGZO), antimony tin oxide (ATO), or the like. But embodiments of the disclosure are not limited thereto.

For example, the anode electrode 231 can also include only reflective electrodes or only transparent electrodes.

A cathode electrode 235 can be formed on the organic light emitting layer 233. The cathode electrode 235 can be a transmissive electrode. The cathode electrode 235 can be formed of, e.g., TCO such as ITO, IZO, IGZO, ATO, etc. Further, the cathode electrode 235 can be a transflective electrode. The cathode electrode 235 can be formed of a thin metal film having transflectivity of light. The metal film can be formed of magnesium (Mg), an alloy of silver (Ag) and magnesium (Mg), or multiple layers thereof. But embodiments of the disclosure are not limited thereto. In embodiments of the disclosure, the cathode electrode 235 can also include only transmissive electrodes, only transflective electrodes, or a combination thereof.

An encapsulation layer 218 in which a plurality of organic films and inorganic films are stacked can be further formed on the organic light emitting layer 233 and the cathode electrode 235.

In embodiments of the disclosure, at least one of the anode electrode 231, the organic light emitting layer 233, and the cathode electrode 235 can be disposed in the emission portion EP, but embodiments of the disclosure are not limited thereto. For example, one or more of the anode electrode 231, the organic light emitting layer 233, and the cathode electrode 235 can be disposed in both the emission portion EP and the transparent portion TP. In FIG. 4, the organic light emitting layer 233 extends into the transparent portion TP. Additionally, the organic light emitting layer 233 can be disposed on other areas of the transparent display panel 130.

With reference to FIG. 4, when the organic light emitting layer 233 is disposed in the transparent portion TP, a thickness of the organic light emitting layer 233 disposed in the transparent portion TP can be different from a thickness of the organic light emitting layer 233 disposed in the emission portion EP or the other areas of the transparent display panel 130. For example, the thickness of the organic light emitting layer 233 disposed in the transparent portion TP can be greater than that disposed in the emission portion EP. But embodiments of the disclosure are not limited thereto.

The encapsulation layer 218 can be formed by alternately stacking a plurality of inorganic films and organic films. For example, the inorganic film can be formed of at least one of aluminum oxide (AlxOx), SiOx, SiNx, SiON, and LiF to primarily block penetration of external moisture or oxygen, but embodiments of the disclosure are not limited thereto. The organic film can secondarily block the penetration of external moisture or oxygen. The organic film serves as a buffer for relieving stress between layers due to bending of the display device 100 and can also serve to enhance planarization performance. Such an organic film can be formed of a polymer material such as an acrylic resin, an epoxy resin, polyimide, or polyethylene, but is not limited thereto.

The transmittance adjusting member 120 included in the display device 100 according to embodiments of the disclosure can include a liquid crystal layer or a phase film that can polarize and transmit light transmitted through the first polarizing layer 110 or can transmit the light without polarizing or polarization.

Figure 5:
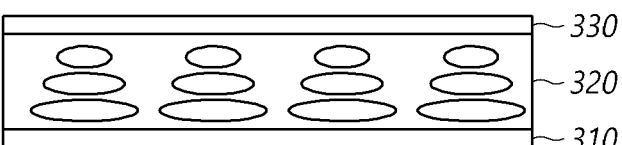
FIG. 5 is a cross-sectional view illustrating an example transmittance adjusting member applied to a display device according to embodiments of the disclosure.

FIG. 5 is a cross-sectional view illustrating an example transmittance adjusting member 120 applied to a display device 100 according to embodiments of the disclosure.

Referring to FIG. 5, the transmittance adjusting member 120 can include a first transparent electrode 310, a liquid crystal layer 320 positioned on the first transparent electrode 310, and a second transparent electrode 330 positioned on the liquid crystal layer 320.

The liquid crystal layer 320 can be disposed between the first transparent electrode 310 and the second transparent electrode 330.

The first transparent electrode 310 can be disposed between the first polarizing plate 110 and the liquid crystal layer 320, and the second transparent electrode 330 can be disposed between the liquid crystal layer 320 and the transparent display panel 130.

Each of the first transparent electrode 310 and the second transparent electrode 330 can include TCO such as ITO, IZO, IGZO, ATO, or the like, but embodiments of the disclosure are not limited thereto.

When an electrical signal is applied to the first transparent electrode 310 and the second transparent electrode 330, the liquid crystal arrangement of the liquid crystal layer 320 can be adjusted so that the transmittance of the liquid crystal layer 320 can be varied. In other words, the transmittance of the liquid crystal layer 320 can be controlled through a phase change of the liquid crystal by an electric field applied to the liquid crystal layer 320.

The liquid crystal layer 320 can adopt any liquid crystal structure capable of polarizing light linearly polarized by the first polarizing plate 110.

For example, the liquid crystal layer 320 can have any one driving mode among a vertical alignment (VA) mode, a patterned vertical alignment (PVA) mode, an in-plane switching (IPS) mode, an advanced horizontal in-plane switching (AH-IPS) mode, a plane to line switching (PLS) mode, an electrically controlled birefringence (ECB) mode, a twisted nematic (TN) mode, a super twisted nematic (STN) mode, and a hybrid mode. But embodiments of the disclosure are not limited thereto.

The transmittance adjusting member 120 illustrated in FIG. 5 can include a first mode in which light transmitted through the first polarizing plate 110 is polarized while passing through the liquid crystal layer 320, and a second mode in which light transmitted through the first polarizing plate 110 passes through the liquid crystal layer 320 without being polarized.

The display device 100 according to embodiments of the disclosure can adjust light transmittance as the transmittance adjusting member 120 includes the liquid crystal layer 320, thereby enhancing the sharpness and visibility of the image implemented in the display device.

The display device 100 according to embodiments of the disclosure can adjust light transmittance, thereby enhancing sharpness and visibility of the implemented image, thereby enabling low power consumption.

Figure 6A:
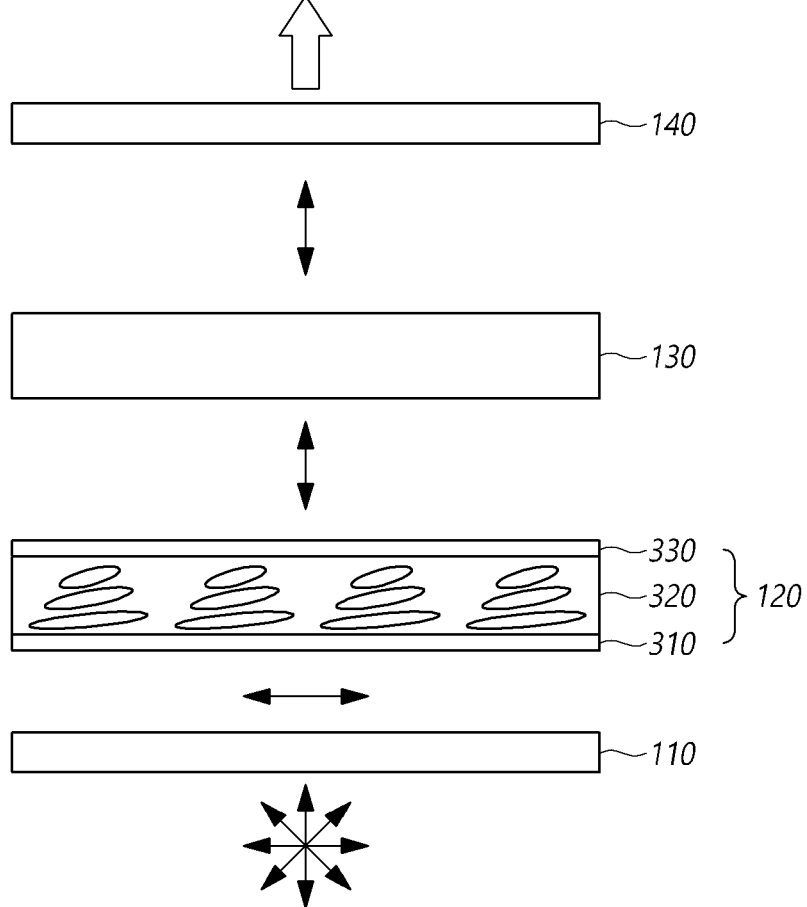
FIGS. 6A and 6B are views illustrating a light transmission mode and a light blocking mode in a display device according to embodiments of the disclosure, according to the embodiment of the transmittance adjusting member of FIG. 5.
Figure 6B:
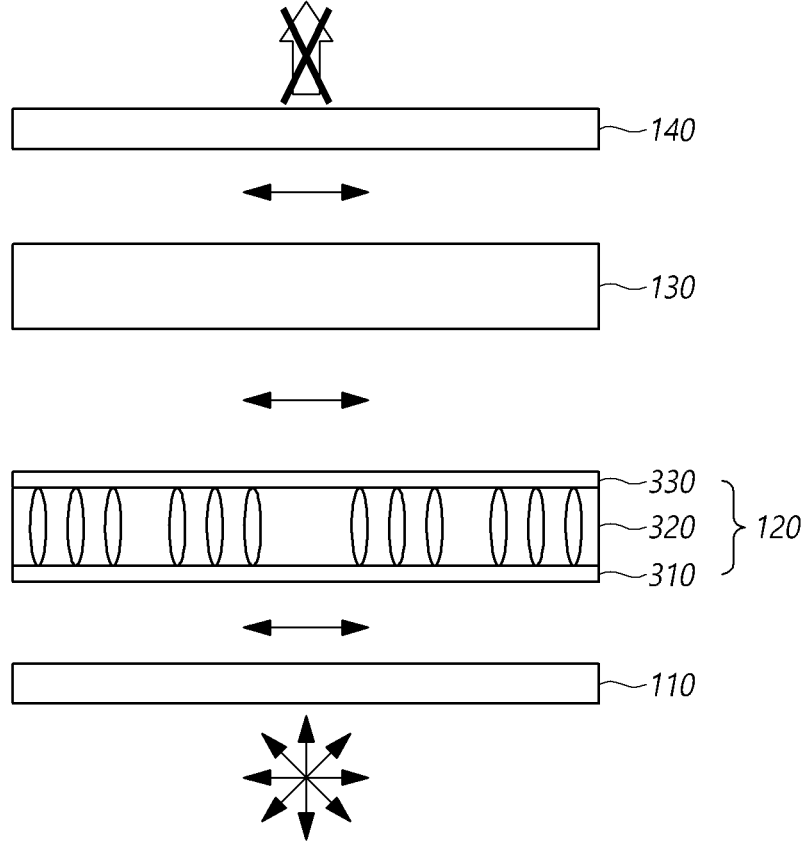

FIGS. 6A and 6B are views, respectively illustrating a light transmission mode and a light blocking mode in a display device 100 according to embodiments of the disclosure, according to the embodiment of the transmittance adjusting member 120 of FIG. 5.

In the following description of the display device 100 illustrated in FIGS. 6A and 6B, the light transmission axis of the first polarizing plate 110 and the light transmission axis of the second polarizing plate 140 are disposed to be orthogonal to each other, and the liquid crystal layer 320 is driven in a twisted nematic (TN) mode.

The light transmission mode is described with reference to FIG. 6A.

External light incident on the first polarizing plate 110 from the outside is linearly polarized in a first direction by the first polarizing plate 110 and is incident on the transmittance adjusting member 120 including the liquid crystal layer 320.

The light linearly polarized in the first direction incident on the transmittance adjusting member 120 is linearly polarized in a second direction by the liquid crystal layer 320 and is incident on the transparent display panel 130. In this case, the first direction and the second direction are directions orthogonal to each other.

The light linearly polarized in the second direction incident on the transparent display panel 130 passes through the transparent display panel 130 without being polarized and is incident on the second polarizing plate 140. In this case, since the first polarizing plate 110 and the second polarizing plate 140 are orthogonal to each other, light incident on the second polarizing plate 140 can pass through the second polarizing plate 140 as it is.

In other words, it corresponds to the first mode where the transmittance adjusting member 120 includes the liquid crystal layer 320.

Therefore, the light transmission mode can be implemented in which the user can view objects or images positioned on the opposite side of the display device 100 since the external light is output through the second polarizing plate 140.

The light blocking mode is described with reference to FIG. 6B.

External light incident on the first polarizing plate 110 from the outside is linearly polarized in a first direction by the first polarizing plate 110 and is incident on the transmittance adjusting member 120 including the liquid crystal layer 320.

The light linearly polarized in the first direction incident on the transmittance adjusting member 120 is, without being polarized by the liquid crystal layer 320, incident on the transparent display panel 130.

The light linearly polarized in the first direction incident on the transparent display panel 130 passes through the transparent display panel 130 without being polarized and is incident on the second polarizing plate 140. In this case, since the first polarizing plate 110 and the second polarizing plate 140 are orthogonal to each other, light incident on the second polarizing plate 140 is blocked by the second polarizing plate 140.

In other words, it corresponds to the second mode where the transmittance adjusting member 120 includes the liquid crystal layer 320.

Therefore, the light blocking mode can be implemented in which the user may not view objects or images positioned on the opposite side of the display device 100 since the external light is blocked by the second polarizing plate 140.

In FIGS. 6A and 6B, in another embodiment of the disclosure that is unlike the description above where the light transmission axis of the first polarizing plate 110 and the light transmission axis of the second polarizing plate 140 are orthogonal to each other, when the light transmission axis of the first polarizing plate 110 and the light transmission axis of the second polarizing plate 140 are disposed parallel to each other without being orthogonal to each other, the light blocking mode can be used in the case of FIG. 6A, and the light transmission mode can be used in the case of FIG. 6B. In other words, when the light transmission axis of the first polarizing plate 110 and the light transmission axis of the second polarizing plate 140 are disposed parallel to each other and the transmittance adjusting member 120 includes the liquid crystal layer 320, the light blocking mode can be the first mode, and the light transmission mode can be the second mode. Accordingly, whether the display device 100 is operated in the light transmission mode or the light blocking mode can be selected based on whether the light transmission axis of the first polarizing plate 110 and the light transmission axis of the second polarizing plate 140 are parallel or orthogonal to each other.

In the embodiments of the disclosure of FIGS. 6A and 6B, the transparent display panel 130 is shown as being disposed between the transmittance adjusting member 120 and the second polarizing plate 140, but embodiments of the disclosure are not limited thereto. For example, the transparent display panel 130 can be disposed between the first polarizing plate 110 and the transmittance adjusting member 120, whereby light linearly polarized in the first direction will be incident on the transparent display panel 130 without being polarized prior to being incident on the transmittance adjusting member 120.

Figure 7:
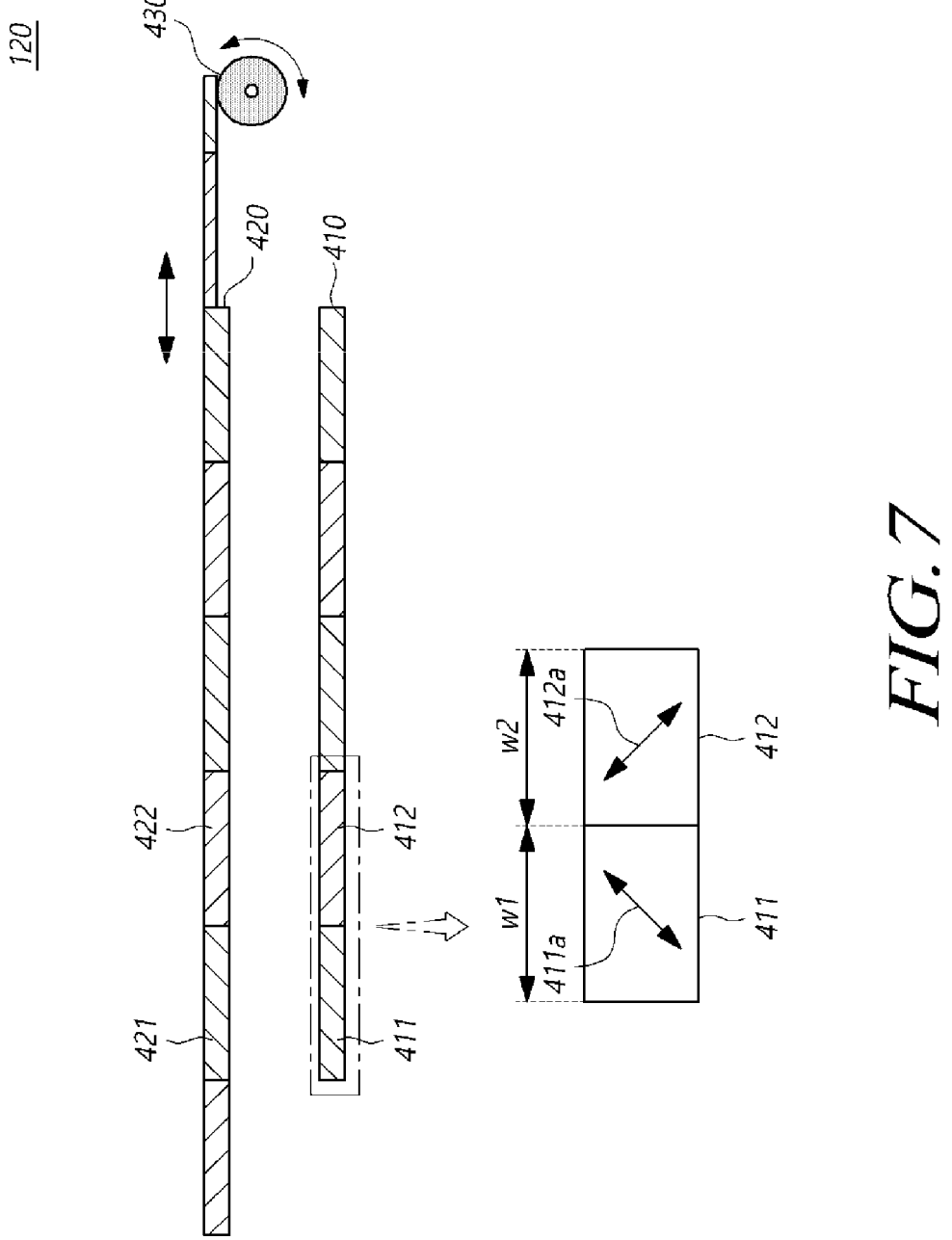
FIG. 7 is a cross-sectional view illustrating another example transmittance adjusting member applied to a display device according to embodiments of the disclosure.

FIG. 7 is a cross-sectional view illustrating another example transmittance adjusting member 120 applied to a display device 100 according to embodiments of the disclosure.

Referring to FIG. 7, the transmittance adjusting member 120 can include a first phase film 410 and a second phase film 420 positioned on the first phase film 410.

The first phase film 410 can be disposed between the first polarizing plate 110 and the second phase film 420, and the second phase film 420 can be disposed between the first phase film 410 and the transparent display panel 130.

The first phase film 410 can be a quarter-wave plate (QWP) having a phase delay value of $\lambda/4$.

The first phase film 410 can include a first area 411 having a first optical axis 411a and a second area 412 having a second optical axis 412a. The first area 411 and the second area 412 of the first phase film 410 can be alternately disposed.

The first optical axis 411a of the first phase film 410 can form an angle of 45 degrees with the light transmission axis of the first polarizing plate 110, and the first optical axis 411a and the second optical axis 412a of the first phase film 410 can be orthogonal to each other.

The second phase film 420 can be a quarter-wave plate (QWP) having a phase delay value of $\lambda/4$.

The second phase film 420 can include a first area 421 having a first optical axis and a second area 422 having a second optical axis. The first area 421 and the second area 422 of the second phase film 420 can be alternately disposed.

The first optical axis of the second phase film 420 can have the same direction as the first optical axis 411a of the first phase film 410, and the first optical axis and the second optical axis of the second phase film 420 can be orthogonal to each other.

In other words, the first optical axis 411a of the first phase film 410 and the first optical axis of the second phase film 420 can have the same direction, and the second optical axis 412a of the first phase film 410 and the second optical axis of the second phase film 420 can have the same direction.

Referring to FIG. 7, the transmittance adjusting member 120 can include a moving member for moving at least one of the first phase film 410 or the second phase film 420 relative to each other. Such a movement can be horizontal, vertical, diagonal, or a combination thereof, but embodiments of the disclosure is not limited thereto. Hereafter, the movement of the first phase film 410 or the second phase film 420 relative to each other will be described as a horizontal movement for sake of convenience based on the orientation of the drawing figures.

Here, the horizontal movement can mean a movement in a row direction or a movement in a column direction. For example, referring to FIG. 1, moving in the row direction can mean moving left and right, and moving in the column direction can mean moving up and down.

The moving member can be disposed on one side or two opposite sides of the first phase film 410 or the second phase film 420.

The moving member can horizontally move at least one of the first phase film 410 or the second phase film 420 so that the first area 411 of the first phase film 410 and the first area 421 of the second phase film 420 overlap each other, or the first area 411 of the first phase film 410 and the second area 422 of the second phase film 420 overlap each other.

As the moving member, a rotating member or an electromagnet capable of horizontally moving a phase film can be used, but embodiments of the disclosure are not limited thereto.

FIG. 7 illustrates an example in which the transmittance adjusting member 120 uses a rotating member 430 as the moving member for horizontally moving the phase film.

For example, in the transmittance adjusting member 120 illustrated in FIG. 7, the first phase film 410 can be fixed to the display device 100, and the second phase film 420 can be moved in the horizontal direction by the moving member, such as the rotation of the rotation member 430 connected to one side of the second phase film 420.

Referring to FIG. 7, the first area 411 of the first phase film 410 and the first area 421 of the second phase film 420 overlap each other, and the second area 412 of the first phase film 410 and the second area 422 of the second phase film 420 overlap each other, and one end of the second phase film 420 is connected to the rotating member 430. In this case, when the rotating member 430 is rotated clockwise, the second phase film 420 can horizontally move to the right, so that the first area 411 of the first phase film 410 and the second area 422 of the second phase film 420 overlap each other, and the second area 412 of the first phase film 410 and the first area 421 of the second phase film 420 overlap each other.

In this case, the horizontal movement distance of the second phase film 420 to change from the state in which the first area 411 of the first phase film 410 and the first area 421 of the second phase film 420 overlap each other to the state in which the first area 411 of the first phase film 410 and the second area 422 of the second phase film 420 overlap each other can be the same as the width of each area of the first phase film 410 or the second phase film 420.

Further, when the rotating member 430 is rotated in the counterclockwise direction, the second phase film 420 can be horizontally moved to the left, returning to the original state in which the first area 411 of the first phase film 410 and the first area 421 of the second phase film 420 overlap each other, and the second area 412 of the first phase film 410 and the second area 422 of the second phase film 420 overlap each other.

Referring to FIG. 7, the first area 411 and the second area 412 of the first phase film 410 can have the same width. In other words, in the first phase film 410, the width w1 of the first area 411 and the width w2 of the second area 412 can have the same width.

Further, the first area 421 and the second area 422 of the second phase film 420 can have the same width.

The first area 411 of the first phase film 410 and the first area 421 of the second phase film 420 can have the same width, and the second area 412 of the first phase film 410 and the second area 422 of the second phase film 420 can have the same width.

In other words, the first area 411 and the second area 412 of the first phase film 410 and the first area 421 and the second area 422 of the second phase film 420 can have the same width.

For example, referring to FIG. 7, the horizontal movement distance of the second phase film 420 to change from the state in which the first area 411 of the first phase film 410 and the first area 421 of the second phase film 420 overlap each other to the state in which the first area 411 of the first phase film 410 and the second area 422 of the second phase film 420 overlap each other can be an odd multiple of the width w1 of the first area 411 such as w1, 3×w1, 5×w1, or the like.

In this case, when the horizontal movement distance increases, the speed at which the first phase film 410 and the second phase film 420 overlap each other can decrease, and a space for the moving member can be further required. Further, when the horizontal movement distance is reduced, the speed at which the first phase film 410 and the second phase film 420 overlap each other is increased, and the space for the moving member can be reduced.

In the display device 100 according to embodiments of the disclosure, the distance at which the second phase film 420 horizontally moves is not limited by the size or arrangement of pixels, and can be set such that the first area 411 and the second area 412 of the first phase film 410 and the first area 421 and the second area 422 of the second phase film 420 overlap each other.

For example, in the transparent display panel 130, pixels including the emission portion EP and the transparent portion TP can be disposed, and the width of the pixel can be defined as a pitch.

When the emission portion EP and the transparent portion TP have the same width, they can each have a width of ½ pitch. In this case, the first area 411 of the first phase film 410 can correspond to one emission portion EP, and the second area 412 of the first phase film 410 can correspond to one transparent portion TP. In other words, the width w1 of the first area 411 of the first phase film 410 and the width of one emission portion EP can correspond to the same size, and the width w2 of the second area 412 of the first phase film 410 and the width of one transparent portion TP can correspond to the same size. In this case, the distance at which the phase film horizontally moves can be the same as the width of the first area w1 of the first phase film 410, and can be the same as the width of the emission portion EP or the transparent portion TP, which is ½ pitch of the pixel.

Further, even when the widths of the emission portion EP and the transparent portion TP are not the same, the distance at which the phase film horizontally moves can be the same as the width of the first area w1 of the first phase film 410 and can be the same as the ½ pitch of the pixel, and is not limited by the arrangement of the emission portion EP and the transparent portion TP.

Therefore, the distance at which the phase film moves horizontally is not limited by the width or arrangement of the emission portion EP or the transparent portion TP.

The first area 411 and the second area 412 of the first phase film 410 can correspond to the pixel including the emission portion EP and the transparent portion TP. Each of the first area 411 and the second area 412 of the first phase film 410 can correspond to one pixel, and can correspond to two or more pixels of the same number, which means that each of the widths of the first area 411 and the second area

412 of the first phase film 410 is one pitch or two pitches or more. Further, the first area 411 and the second area 412 of the first phase film 410 can correspond to each other by sharing an odd number of pixels such as three or five pixels, and each of the widths of the first area 411 and the second area 412 of the first phase film 410 can have a width such as 3/2 pitch and 5/2 pitch.

In other words, the distance at which the phase film horizontally moves can be the same as the width w1 of the first area 411 of the first phase film 410 and can be the same as the 1 pitch, 3/2 pitch, 2 pitch, 5/2 pitch, or the like of the pixel, and is not limited by the pixel arrangement.

Accordingly, the distance at which the phase film horizontally moves is not limited by the width or arrangement of the pixel. The first phase film 410 and the second phase film 420 can include a phase pattern disposed on the transparent substrate. The phase pattern can be disposed in the same direction as the first optical axis and the second optical axis described above.

The transparent substrate where the phase pattern is disposed can include any one of a glass substrate, tri-acetate cellulose (TAC), cycloolefin polymer (COP), polycarbonate (PC), polymethyl methacrylate (PMMA), polyethylene terephthalate (PET), polyethylene naphthalate (PEN), polyethersulfone (PES), polystyrene (PS), and polyimide (PI). But embodiments of the disclosure are not limited thereto.

The transmittance adjusting member 120 illustrated in FIG. 7 can include a first mode in which the first area 411 of the first phase film 410 and the first area 421 of the second phase film 420 overlap each other, and a second mode in which the first area 411 of the first phase film 410 and the second area 422 of the second phase film 420 overlap each other.

The display device 100 according to embodiments of the disclosure can adjust light transmittance as the transmittance adjusting member 120 includes the first phase film 410 and the second phase film 420, thereby enhancing the sharpness and visibility of the image implemented in the display device.

The display device 100 according to embodiments of the disclosure can adjust light transmittance, thereby enhancing sharpness and visibility of the implemented image, thereby enabling low power consumption.

Figure 8A:
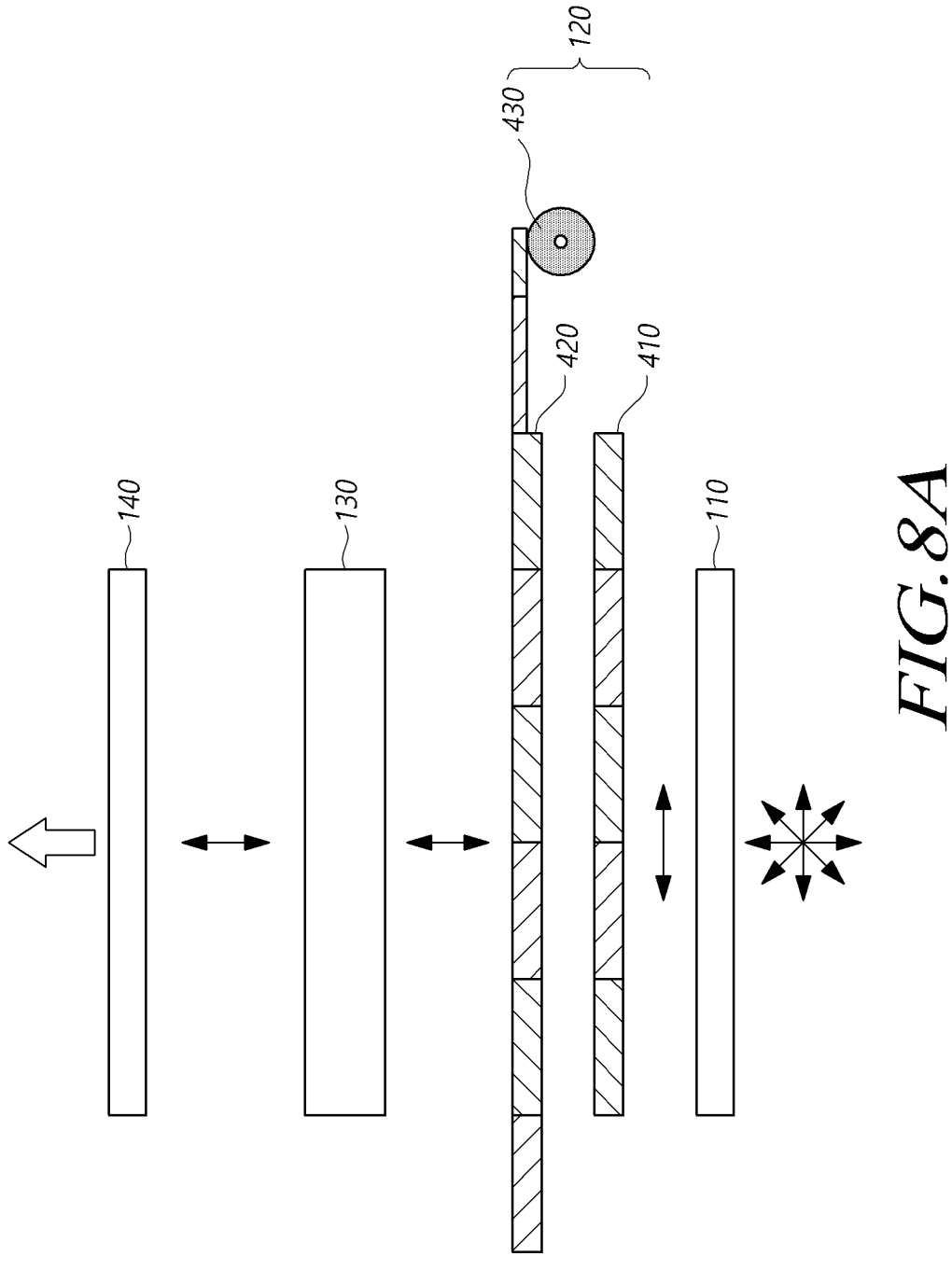
FIGS. 8A and 8B are views illustrating a light transmission mode and a light blocking mode in a display device according to embodiments of the disclosure, according to the embodiment of the transmittance adjusting member of FIG. 7.
Figure 8B:
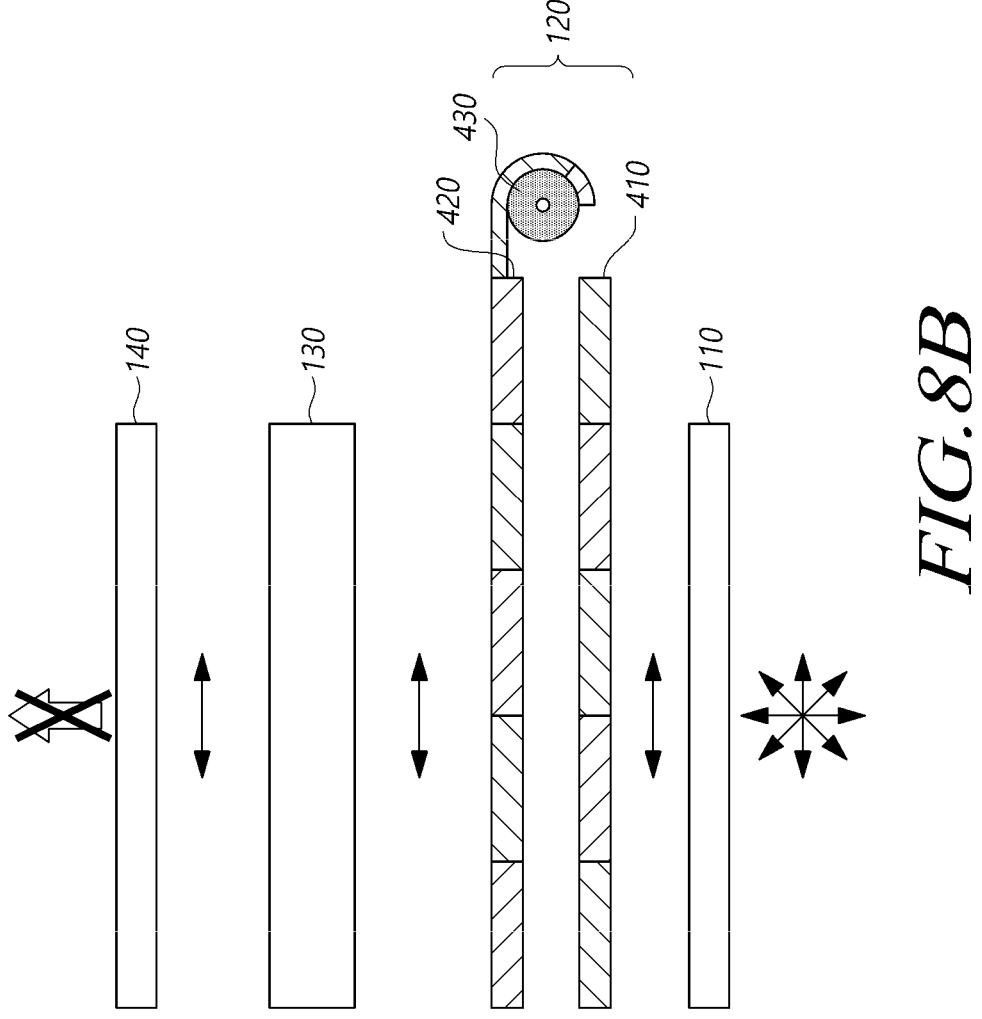

FIGS. 8A and 8B are views illustrating a light transmission mode and a light blocking mode in a display device according to embodiments of the disclosure, according to the embodiment of the transmittance adjusting member of FIG. 7.

In the following description of the display device 100 illustrated in FIGS. 8A and 8B, the light transmission axis of the first polarizing plate 110 and the light transmission axis of the second polarizing plate 140 are disposed to be orthogonal to each other, the first optical axes of the first phase film 410 and the second phase film 420 have the same direction, and the second optical axes of the first phase film 410 and the second phase film 420 are orthogonal to the first optical axes of the first phase film 410 and the second phase film 420.

The light transmission mode is described with reference to FIG. 8A.

External light incident on the first polarizing plate 110 from the outside is linearly polarized in a first direction by the first polarizing plate 110 and is incident on the transmittance adjusting member 120 including the first phase film 410 and the second phase film 420.

Light linearly polarized in the first direction incident on the first phase film 410 is incident on the second phase film 420, as polarized light phase-delayed the 45-degree direction with respect to the first direction in the first area of the first phase film 410 and polarized light phase-delayed in the 135-degree direction with respect to the first direction in the second area of the first phase film 410.

In this case, the first phase film 410 and the second phase film 420 are in a state in which the first area of the first phase film 410 and the first area of the second phase film 420 overlap each other by the rotating member 430.

Since the first area of the first phase film 410 and the first area of the second phase film 420 overlap each other, polarized light phase-delayed in the 45-degree direction with respect to the first direction incident on the first area of the second phase film 420, as polarized light phase-delayed in the second direction perpendicular to the first direction, and polarized light phase-delayed in the 135-degree direction with respect to the first direction incident on the second area of the second phase film 420, as polarized light phase-delayed in the second direction perpendicular to the first direction, are incident on the transparent display panel 130.

The light linearly polarized in the second direction incident on the transparent display panel 130 passes through the transparent display panel 130 without being polarized and is incident on the second polarizing plate 140. In this case, since the first polarizing plate 110 and the second polarizing plate 140 are orthogonal to each other, light incident on the second polarizing plate 140 can pass through the second polarizing plate 140 as it is.

In other words, it corresponds to the first mode where the transmittance adjusting member 120 includes the first phase film 410 and the second phase film 420.

Therefore, the light transmission mode can be implemented in which the user can view objects or images positioned on the opposite side of the display device 100 since the external light is output through the second polarizing plate 140.

The light blocking mode is described with reference to FIG. 8B.

External light incident on the first polarizing plate 110 from the outside is linearly polarized in a first direction by the first polarizing plate 110 and is incident on the transmittance adjusting member 120 including the first phase film 410 and the second phase film 420.

Light linearly polarized in the first direction incident on the first phase film 410 is incident on the second phase film 420, as polarized light phase-delayed in the 45-degree direction with respect to the first direction in the first area of the first phase film 410 and polarized light phase-delayed in the 135-degree direction with respect to the first direction in the second area of the first phase film 410.

In this case, when the rotating member 430 connected to one end of the second phase film 420 is rotated clockwise, the second phase film 420 is horizontally moved to the right, so that the first area of the first phase film 410 and the second area of the second phase film 420 overlap each other, and the second area of the first phase film 410 and the first area of the second phase film 420 overlap each other.

Since the first area of the first phase film 410 and the second area of the second phase film 420 overlap each other, polarized light phase-delayed in the 45-degree direction with respect to the first direction incident on the second area of the second phase film 420, as polarized light phase-delayed in the first direction, and polarized light phase-delayed in the 135-degree direction with respect to the first direction incident on the first area of the second phase film 420, as polarized light phase-delayed in the first direction, are incident on the transparent display panel 130.

In other words, the light linearly polarized in the first direction incident on the transmittance adjusting member 120 is, without being polarized by the first phase film 410 and the second phase film 420, incident on the transparent display panel 130.

The light linearly polarized in the first direction incident on the transparent display panel 130 passes through the transparent display panel 130 without being polarized and is incident on the second polarizing plate 140. In this case, since the first polarizing plate 110 and the second polarizing plate 140 are orthogonal to each other, light incident on the second polarizing plate 140 is blocked by the second polarizing plate 140.

In other words, it corresponds to the second mode where the transmittance adjusting member 120 includes the first phase film 410 and the second phase film 420.

Therefore, the light blocking mode can be implemented in which the user may not view objects or images positioned on the opposite side of the display device 100 since the external light is blocked by the second polarizing plate 140.

In FIGS. 8A and 8B, in another embodiment of the disclosure that is unlike the description above where the light transmission axis of the first polarizing plate 110 and the light transmission axis of the second polarizing plate 140 are orthogonal to each other, when the light transmission axis of the first polarizing plate 110 and the light transmission axis of the second polarizing plate 140 are disposed parallel to each other without being orthogonal to each other, the light blocking mode can be used in the case of FIG. 8A, and the light transmission mode can be used in the case of FIG. 8B. In other words, when the light transmission axis of the first polarizing plate 110 and the light transmission axis of the second polarizing plate 140 are disposed parallel to each other and the transmittance adjusting member 120 includes the first phase film 410 and the second phase film 420, the light blocking mode can be the first mode, and the light transmission mode can be the second mode. Accordingly, whether the display device 100 is operated in the light transmission mode or the light blocking mode can be selected based on whether the light transmission axis of the first polarizing plate 110 and the light transmission axis of the second polarizing plate 140 are parallel or orthogonal to each other.

In the embodiments of the disclosure of FIGS. 8A and 8B, the transparent display panel 130 is shown as being disposed between the transmittance adjusting member 120 and the second polarizing plate 140, but embodiments of the disclosure are not limited thereto. For example, the transparent display panel 130 can be disposed between the first polarizing plate 110 and the transmittance adjusting member 120, whereby light linearly polarized in the first direction will be incident on the transparent display panel 130 without being polarized prior to being incident on the transmittance adjusting member 120.

Additionally, in the embodiments of the disclosure of FIGS. 8A and 8B, the first phase film 410 and the second phase film 420 of the transmittance adjusting member 120 need not be immediately adjacent to each other, or be on the same side of the transparent display panel 130. For example, the first phase film 410 can be disposed on a first side of the transparent display panel 130 and the second phase film 420 can be disposed on a second side of the transparent display panel 130, or vice-versa. Additionally, the rotating member 430 can be attached to the second phase film 420 so as to move the second phase film 420 relative to the first phase film 410 that is fixed, but such is not required. For example, the rotating member 430 can be attached to the first phase film 410 so that the first phase film 410 can be moved relative to the second phase film 420 that is fixed. Meanwhile, in other embodiments of the disclosure, both the first phase film 410 and the second phase film 420 can move relative to each other simultaneously, whereby the first phase film 410 can move in a first direction and the second phase film 420 can move in a second direction that is opposite to the first direction.

In various embodiments of the disclosure, the first area 411 and the second area 412 of the first phase film 410, and the first area 421 and the second area 422 of the second phase film 420 can have the same thickness or different thickness. If different, the thickness can vary based on a wavelength of light that is meant to pass through the areas 411, 412, 421 and 422. Similarly, the numerical values of (i.e., the square areas) and/or shape of the respective areas 411, 412, 421 and 422 can correspond to a sub pixel area of an organic light emitting element (see FIG. 4). But embodiments of the disclosure are not limited thereto.

In various embodiments of the disclosure, the transmittance adjusting member 120 of the embodiment of FIGS. 6A and 6B, and the transmittance adjusting member 120 of the embodiment of FIGS. 8A and 8B can be used together.

Figure 9:
FIG. 9 is a view illustrating a screen when a display device is in a light transmission mode according to embodiments of the disclosure.
Figure 10:
FIG. 10 is a view illustrating a screen when a display device is in a light blocking mode according to embodiments of the disclosure.

FIG. 9 is a view illustrating a screen when a display device is in a light transmission mode according to embodiments of the disclosure. FIG. 10 is a view illustrating a screen when a display device is in a light blocking mode according to embodiments of the disclosure.

Referring to FIG. 9, when the display device is in the light transmission mode, the display device can be implemented as a transparent display device in which the user can view the objects positioned on the opposite side of the display device.

Referring to FIG. 10, when the display device is in the light blocking mode, the user can clearly view the image displayed on the screen of the display device, and thus the display device can be implemented as a transparent display device with enhanced visibility.

Embodiments of the disclosure described above are briefly described below.

Embodiments of the disclosure can provide a display device including a first polarizing plate, a transmittance adjusting member disposed on the first polarizing plate, a transparent display panel disposed on the transmittance adjusting member and including a light emitting element, and a second polarizing plate disposed on the transparent display panel.

The display device according to embodiments of the disclosure can include a light transmission mode in which light transmitted through the transmittance adjusting member is transmitted through the second polarizing plate and a light blocking mode in which the light transmitted through the transmittance adjusting member is blocked by the second polarizing plate.

In the display device according to embodiments of the disclosure, the first polarizing plate and the second polarizing plate can be linear polarizing plates that polarize light in one direction.

In the display device according to embodiments of the disclosure, a light transmission axis of the first polarizing plate can be disposed parallel to or orthogonal to a light transmission axis of the second polarizing plate.

In the display device according to embodiments of the disclosure, the transmittance adjusting member can include a first transparent electrode, a liquid crystal layer positioned on the first transparent electrode, and a second transparent electrode positioned on the liquid crystal layer.

In the display device according to embodiments of the disclosure, the liquid crystal layer can have any one driving mode among a vertical alignment (VA) mode, a patterned vertical alignment (PVA) mode, an in-plane switching (IPS) mode, an advanced horizontal in-plane switching (AH-IPS) mode, a plane to line switching (PLS) mode, an electrically controlled birefringence (ECB) mode, a twisted nematic (TN) mode, a super twisted nematic (STN) mode, and a hybrid mode.

The display device according to embodiments of the disclosure can include a first mode in which light transmitted through the first polarizing plate is polarized while passing through the liquid crystal layer and a second mode in which the light transmitted through the first polarizing plate passes through the liquid crystal layer without being polarized.

In the display device according to embodiments of the disclosure, the transmittance adjusting member can include a first phase film and a second phase film positioned on the first phase film.

In the display device according to embodiments of the disclosure, the first phase film and the second phase film can be quarter-wave plates having a phase delay value of $\lambda/24$.

In the display device according to embodiments of the disclosure, the first phase film and the second phase film each can include a first area having a first optical axis and a second area having a second optical axis. In the first phase film and the second phase film, the first area and the second area can be alternately disposed.

In the display device according to embodiments of the disclosure, in the first phase film and the second phase film, the first optical axis and the second optical axis can be orthogonal to each other.

The display device according to embodiments of the disclosure can include a first mode in which the first area of the first phase film and the first area of the second phase film overlap each other and a second mode in which the first area of the first phase film and the second area of the second phase film overlap each other.

In the display device according to embodiments of the disclosure, the transmittance adjusting member can include a moving member that horizontally moves at least one of the first phase film or the second phase film.

In the display device according to embodiments of the disclosure, the moving member can be disposed on one side or two opposite sides of the first phase film or the second phase film.

In the display device according to embodiments of the disclosure, the first area and the second area of the first phase film can have the same width, and the first area and the second area of the second phase film can have the same width.

In the display device according to embodiments of the disclosure, the first area of the first phase film and the first area of the second phase film can have the same width, and the second area of the first phase film and the second area of the second phase film can have the same width.

In the display device according to embodiments of the disclosure, the first phase film and the second phase film can include a phase pattern disposed on a transparent substrate.

In the display device according to embodiments of the disclosure, the transparent substrates can include any one of a glass substrate, tri-acetate cellulose (TAC), cycloolefin polymer (COP), polycarbonate (PC), polymethyl methacrylate (PMMA), polyethylene terephthalate (PET), polyethylene naphthalate (PEN), polyethersulfone (PES), polystyrene (PS), and polyimide (PI).

Embodiments of the disclosure can provide a display device including a first polarizing plate having a first light transmission axis in a first direction, a second polarizing plate separated from the first polarizing plate by a distance, and having a second light transmission axis in a second direction different from the first direction, a transparent display panel disposed between the first polarizing plate and the second polarizing plate, and including a light emitting element and a transmittance adjusting member disposed between the first polarizing plate and the second polarizing plate, and selectively having a light transmission mode that transmits external light incident on the display device through the display device when a light transmission axis is parallel to the second direction, and a light blocking mode that blocks the external light incident on the display device through the display device when the light transmission axis is parallel to the first direction.

In the display device according to embodiments of the disclosure, the transmittance adjusting member can include at least one of a liquid crystal layer and a phase film, and one of the transparent display panel and the transmittance adjusting member is disposed closer to the first polarizing plate than the other of the transparent display panel and the transmittance adjusting member.

According to embodiments of the disclosure, there can be provided a display device capable of adjusting light transmittance without being limited to the size or arrangement of pixels.

According to embodiments of the disclosure, there can be provided a display device capable of enhancing the sharpness and visibility of images displayed on the display device by adjusting light transmittance.

According to embodiments of the disclosure, there can be provided a display device capable of low power consumption by enhancing the sharpness and visibility of images displayed on the display device.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein can be applied to other embodiments and applications without departing from the spirit and scope of the disclosure. The above description and the accompanying drawings provide an example of the technical idea of the disclosure for illustrative purposes only. For example, the disclosed embodiments are intended to illustrate the scope of the technical idea of the disclosure.

What is claimed is:

1. A display device, comprising:
a first polarizing plate disposed on a substrate;
a transmittance adjusting member disposed on the first polarizing plate;
a transparent display panel disposed on the transmittance adjusting member and including a light emitting element; and
a second polarizing plate disposed on the transparent display panel,
wherein the transmittance adjusting member includes:
a first phase film; and
a second phase film positioned on the first phase film, wherein the first phase film and the second phase film each include a first area having a first optical axis and a second area having a second optical axis,
wherein in the first phase film and the second phase film, the first area and the second area are alternately disposed,
wherein the display device includes:
a first mode in which the first area of the first phase film and the first area of the second phase film overlap each other; and
a second mode in which the first area of the first phase film and the second area of the second phase film overlap each other, and
wherein the transmittance adjusting member includes a moving member that moves at least one of the first phase film and the second phase film relative to the other, thereby selectively establishing the first mode or the second mode.

2. The display device of claim 1, wherein the first phase film and the second phase film are quarter-wave plates having a phase delay value of $\lambda/4$.

3. The display device of claim 1, wherein in the first phase film and the second phase film, the first optical axis and the second optical axis are orthogonal to each other.

4. The display device of claim 1, wherein the moving member is disposed on one side or two opposite sides of the first phase film or the second phase film.

5. The display device of claim 1, wherein the first area and the second area of the first phase film have a same width, and
wherein the first area and the second area of the second phase film have a same width.

6. The display device of claim 5, wherein the first area of the first phase film and the first area of the second phase film have a same width, and
wherein the second area of the first phase film and the second area of the second phase film have a same width.

7. The display device of claim 1, wherein the first phase film and the second phase film include a phase pattern disposed on a transparent substrate.

8. The display device of claim 7, wherein the transparent substrate includes one of:
a glass substrate, tri-acetate cellulose (TAC), cycloolefin polymer (COP), polycarbonate (PC), polymethyl methacrylate (PMMA), polyethylene terephthalate (PET), polyethylene naphthalate (PEN), polyethersulfone (PES), polystyrene (PS), and polyimide (PI).

9. A display device, comprising:
a first polarizing plate having a first light transmission axis in a first direction;
a second polarizing plate separated from the first polarizing plate by a distance, and having a second light transmission axis in a second direction different from the first direction;
a transparent display panel disposed between the first polarizing plate and the second polarizing plate, and including a light emitting element; and
a transmittance adjusting member disposed between the first polarizing plate and the second polarizing plate, and selectively having:
a light transmission mode that transmits external light incident on the display device through the display device when a light transmission axis is parallel to the second direction, and a light blocking mode that blocks the external light incident on the display device through the display device when the light transmission axis is parallel to the first direction, wherein the transmittance adjusting member includes:
a first phase film; and
a second phase film positioned on the first phase film, wherein the first phase film and the second phase film each include a first area having a first optical axis and a second area having a second optical axis, wherein in the first phase film and the second phase film, the first area and the second area are alternately disposed, wherein the display device includes:
a first mode in which the first area of the first phase film and the first area of the second phase film overlap each other; and
a second mode in which the first area of the first phase film and the second area of the second phase film overlap each other, and wherein the transmittance adjusting member includes a moving member that moves at least one of the first phase film and the second phase film relative to the other, thereby selectively establishing the first mode or the second mode.

10. The display device of claim 9, wherein one of the transparent display panel and the transmittance adjusting member is disposed closer to the first polarizing plate than the other of the transparent display panel and the transmittance adjusting member.

* * * * *